United States Patent
Nagai

[11] 3,806,213
[45] Apr. 23, 1974

[54] PLASTIC ROLLER BEARING

[76] Inventor: Yoshiharu Nagai, 8-26, Higashikenrokumachi, Kanazawa, Japan

[22] Filed: Aug. 15, 1972

[21] Appl. No.: 280,797

[30] Foreign Application Priority Data
Aug. 16, 1971 Japan.............................. 46-62212

[52] U.S. Cl. ............................................. 308/207
[51] Int. Cl. ............................................ F16c 19/00
[58] Field of Search ............ 308/207, 213, 194, 196

[56] References Cited
UNITED STATES PATENTS

| | | | |
|---|---|---|---|
| 954,529 | 4/1910 | Lockwood ...................... | 308/207 A |
| 1,203,163 | 10/1916 | Warner et al...................... | 308/213 |
| 2,048,972 | 7/1936 | Scheffler............................ | 308/194 |

FOREIGN PATENTS OR APPLICATIONS

| | | | |
|---|---|---|---|
| 163,943 | 6/1921 | Great Britain...................... | 308/212 |

OTHER PUBLICATIONS
Nylon Parts for Ball Bearings Published in Product Engineering, Feb. 1952, Pages 119–123 relied upon.

*Primary Examiner*—Charles J. Myhre
*Assistant Examiner*—Frank Susko
*Attorney, Agent, or Firm*—Robert E. Burns; Emmanuel J. Lobato

[57] ABSTRACT

A bearing made of plastic in which the outer race is made of two annular elements that define a split therebetween and are adjustably held by threaded screws circumferentially of contact rolling elements made as rollers disposed angularly spaced about a drum-like inner race. The rolling elements are held in spaced relative positions by axial or lateral projections of a retaining member that in conjunction with a ring-like retaining member holds the rolling elements in assembly. This assembly is held in an annular space defined by flanges on the inner race and is disposed circumferentially of the inner race. The inner and outer races and the rolling elements have coacting tapered surfaces that keep the rolling elements tracking accurately.

1 Claim, 5 Drawing Figures

PATENTED APR 23 1974 3,806,213

PLASTIC ROLLER BEARING

BACKGROUND OF THE INVENTION

This invention relates generally to bearings and more particularly to a new and improved plastic roller bearing.

Plastic bearings are known. However, roller and ball bearings made of plastic have not found much practical use. These known plastic bearings generally have the rolling elements therein between the inner and outer races with very little clearance between them in order to insure rotation without excessive clearance and rattling. The making of the bearings as solid elements without any way of adjusting clearances between the races and the rollers has resulted in plastic bearings having many problems, particularly with respect to the moulding of the parts accurately to provide proper clearances.

Generally the construction of bearings requires machining and cutting operations that are expensive and time consuming. The making of moulded elements for bearings out of plastic has not solved the problem since some of these elements still require the machining operations.

SUMMARY OF THE INVENTION

It is a principal object of the present invention to provide a new and improved plastic bearing construction making it possible to make the parts out of plastic by moulding and having these parts operate smoothly when the bearing is assembled without need of any machining operations and the like.

Another object of the present invention is to provide a bearing that can be adjusted to compensate for variations in diameter of a shaft in which the bearing may be mounted or variations in the housing in which the outer race of the bearing is mounted.

Another object of the present invention is the provision of a plastic bearing in which clearance between the inner and outer race and the rotating or rolling elements can be easily regulated and adjusted.

Still another object of the present invention is to provide a plastic bearing in which the components are easily moulded and assembled into a smoothly operating bearing.

The bearing according to the invention comprises a pair of rings or annular elements jointly defining an outer race which has a split normal to the axis of the bearing. The inner race is constructed as a drum-like member. A plurality of contact rolling elements constructed as rollers is provided disposed circumferentially of the inner race and between the inner race and outer race. A cage or retainer defines the spacing and position of the rolling elements relative to each other circumferentially of the inner race. Each rolling element or roller has an axial bore. The cage is constructed from two annular retaining members, one of which has a plurality of laterally or axially extending projections or pins which extend through respective bores of the rolling elements and a second of one of the retaining members comprises a ring which has circumferentially spaced openings into which the free ends of the projections extend. The free ends project outwardly of the respective bores of the rolling elements and the second retaining member functions as a retainer or keeper maintaining the cage and rollers in assembly.

The outer race rings are held together by threaded screws so that the split between the two rings can be adjusted thereby adjusting the clearance between the inner and outer race and the rolling elements.

The inner and outer races are constructed with outer and inner tapered surfaces cooperating with peripheral tapered surfaces on the rollers which have tapered surfaces defining an apex in a central area of the periphery of the rollers.

Other objects and advantages of the bearing in accordance with the invention will appear from the following description or example of the invention and the novel features will be particularly pointed out in the appended claims.

DESCRIPTION OF THE PREFERRED EMBODIMENTS

Figure 2:
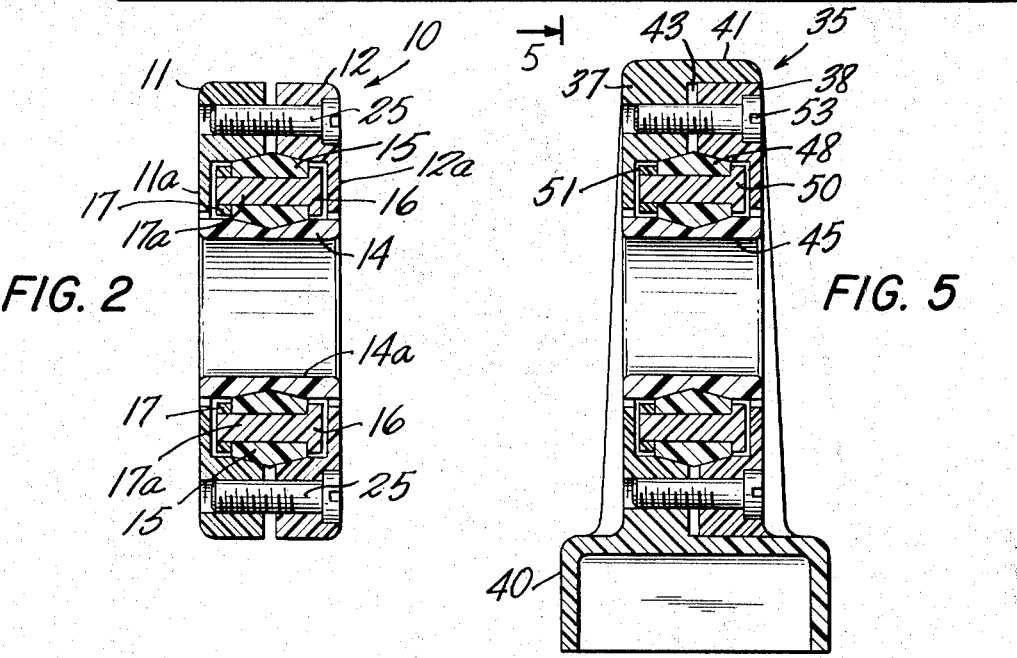
FIG. 2 is a median cross section view of the bearing in FIG. 1.

As illustrated in the drawing a bearing 10 has the various components thereof made in plastic. A pair of rings 11,12 define an outer race coaxial with an inner race 14 between which is disposed a plurality of rolling elements 15 circumferentially of the inner race 14. The rolling elements are constructed as rollers having an axial bore 15a and are held in spaced relationship as illustrated in FIG. 2 by a retainer or cage constructed from retaining elements or members 16 and 17. One of the retaining members 16 has a plurality of laterally extending projections 17a that extends through respective bores of the rollers and into corresponding apertures 18 angularly spaced and provided in the second retaining member 17. The second retaining member 17 receives the free ends of the projections 17 that extend outwardly of the bores of the rollers and is secured to these projections, for example by bonding or heating, so that the cage and rollers are held in assembly.

Figure 3:
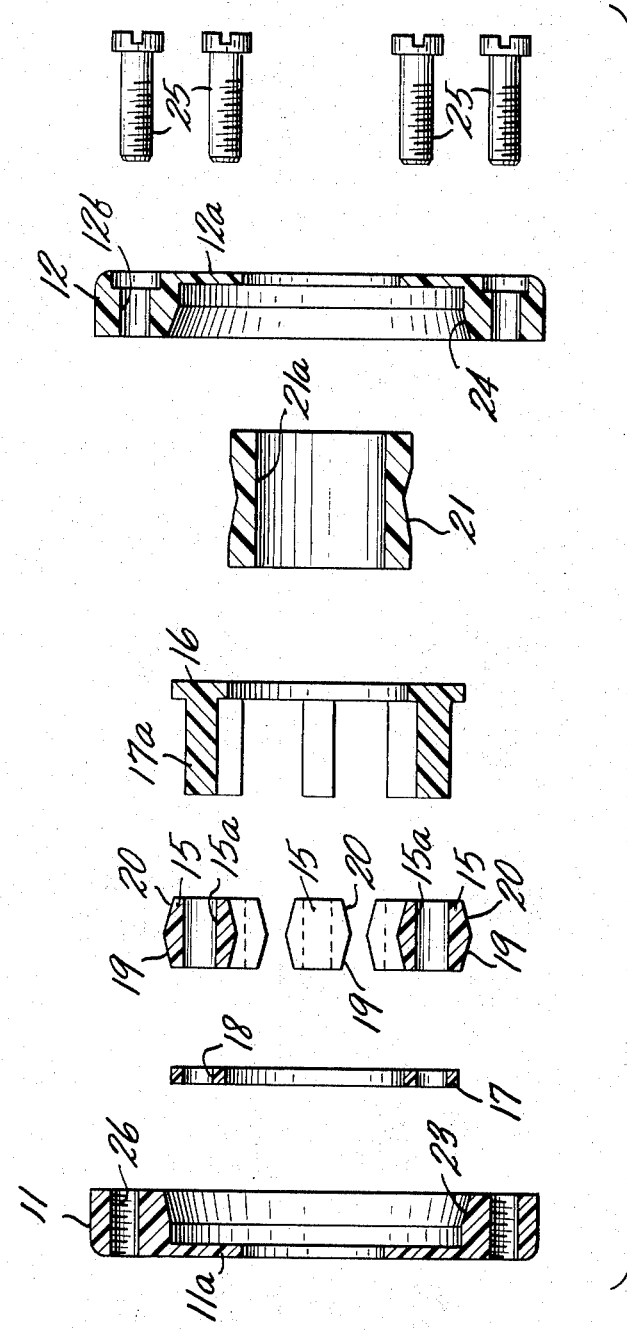
FIG. 3 is an exploded view of the bearing in FIG. 1.

The rolling elements or rollers 15 have tapered surfaces 19,20 that converge to an apex in cross section disposed centrally, circumferentially of the rollers as illustrated in FIG. 3. These tapered surfaces are received in a tapered recess 21 on the outer periphery of the inner race and cooperate with corresponding tapered surfaces 23,24 of the two split rings that form the outer race. These coacting tapered surfaces provide an excellent means of adjusting the clearances among the inner and outer races and the contacting rollers by adjusting the split between the rings 11,12 as hereinafter described.

The split rings 11,12 each has an annular flange 11a,12a extending inwardly as illustrated in FIG. 3 that forms an annular space in conjunction with the inner race within which is housed the assembly of the cage and rollers as illustrated in FIG. 2. One ring 12 is provided with a plurality of holes 12b within which are received threaded screws 25 that extend into threaded openings 26 spaced in a circumferential direction in the other ring 11 so that the outer race is assembled with the assembly of rollers and cage as illustrated in FIG. 2. As can be seen from this cross section view of the drawing, the split between the rings can be adjusted by these threaded members 25 so that the clearance of the cooperating rolling elements and races can be variably adjusted. Thus if a shaft extending through an axial bore 21a in the inner race is too large and the bearing fits snugly thereon, the contact of the rolling elements can be adjusted by compensating for this larger diameter of the shaft by adjusting the threaded screws thereby varying the gap or split between the two rings of the outer race. In like manner, if the outer race is disposed in a housing that is too tight for the bearing and there is a tendency to compress the outer race, the outer race may be adjusted by slacking off on the screws so that the proper clearances of the rolling elements are maintained. Moreover, the tapered surfaces on the various elements coact to maintain the rolling elements or rollers 15 in their proper rotating positions within the tapered groove of the inner race 14.

In order to insure that vibrations will not loosen the bearing, the holes 12b of the ring receiving the head of the threaded screws 25 can have a major diameter portion thereof receiving the screws heads knurled and the heads can likewise be knurled so that there is a better frictional engagement between the bolt and the outer race rings and the bolts will not tend to vibrate loose thereby varying the adjustment of the clearance of the rotating elements. The adjustment can be retained accurately.

Figure 1:
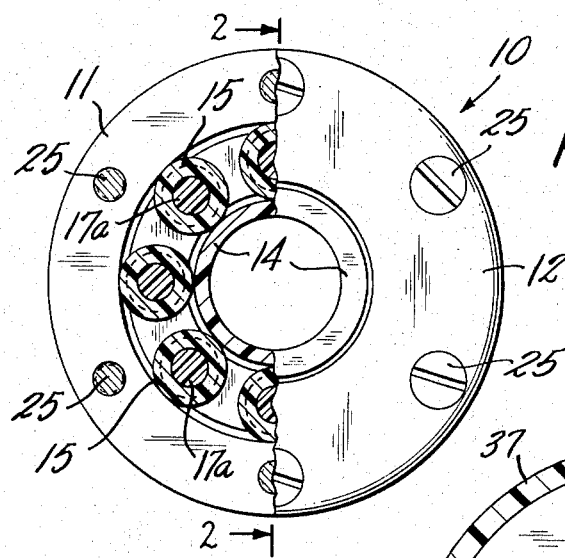
FIG. 1 is a front elevation view, partly in section, illustrating a bearing according to the invention.
Figure 4:
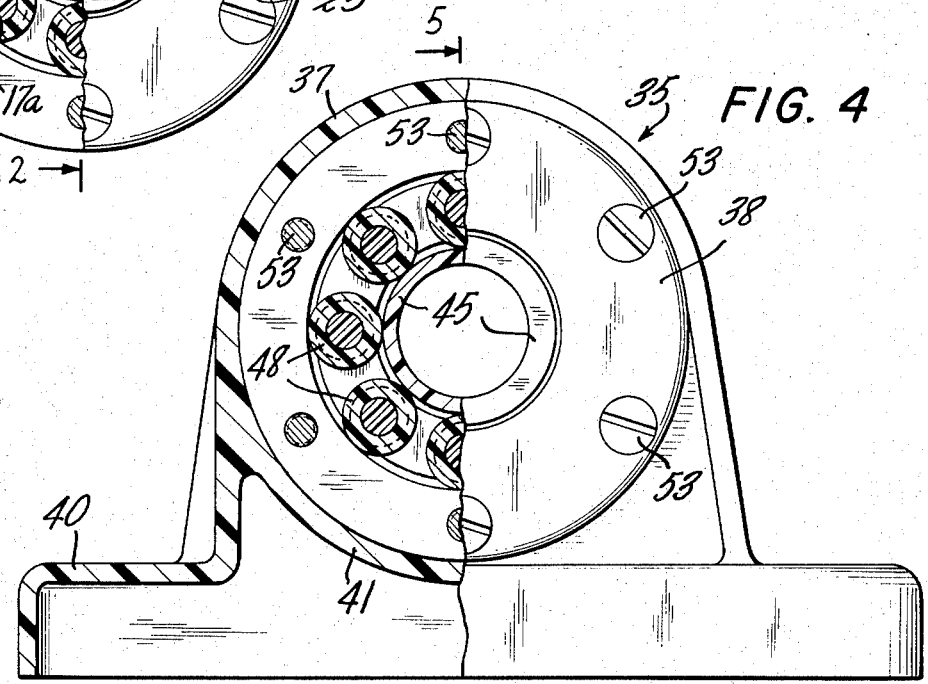
FIG. 4 is a front elevation view, partly in section, of a second embodiment of the bearing according to the invention.
Figure 5:
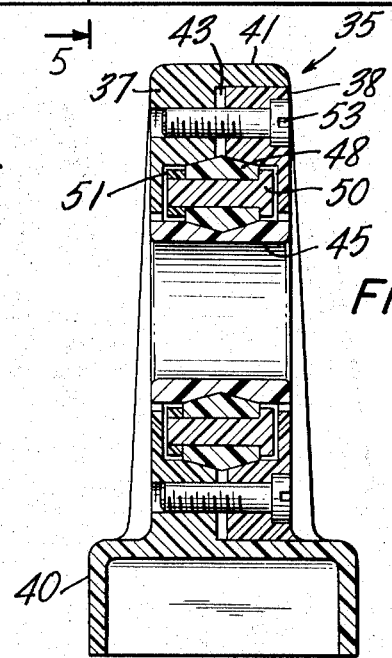
FIG. 5 is a median section view of the bearing in FIG. 4.

The bearing construction according to the invention can be modified in order to provide a pedestal bearing 35 as illustrated in FIGS. 4 and 5 of the drawing. In this construction the outer race is constructed from two annular elments 37,38. A pedestal or base 40 is provided on one of these annular elements, for example the element 37. This element has an annular flange 41 that is made integral with the pedestal or base 40 and defines an annular recess within which is received the other ring 38 coacting therewith to form the outer race of this construction of the bearing. A split or gap 43 is provided in this construction as before described with respect to the construction in FIG. 1 and an inner race 45, rolling elements 48 and cage members 50,51 coact with the outer race in the manner heretofore described when adjusting screws 53 are adjusted in the manner similar to the construction in the first embodiment. The second embodiment construction functions in the same manner as the embodiment first described except that the pedestal is provided integral with the outer race and the outer race construction is modified.

In each embodiment the inner race has a peripheral groove defined by tapered surfaces that converge toward the axis of the inner race. The rolling elements have tapered peripheral surfaces that converge to an apex disposed in a plane normal to the axis of the individual rollers and when in assembly this plane is normal to the axis of the bearing. The outer race inner tapered surfaces diverge from the axis so that the bearing rolling elements are maintained tracking accurately in the groove on the inner race. The adjusting of the screws causes all of the tapered surfaces to coact and the clearances thereof can be adjusted. Thus the construction provides for making of the bearing parts simply by moulding thereby eliminating costly machining operations. The construction elminates abrasion of the contacting relatively movable surfaces.

The inner and outer races may be constructed of polyacetal resin and a phenol resin may be used for constructing the rotating or roller elements. Moreover, even if the PV value is above 20 kgm/cm, the bearing may still be constructed and operate properly. The parts are very easily moulded in view of their configuration and are readily assembled.

The bearing, if made of plastic, will not rust and will resist attack by various liquids if used in corrosive liquids and requires no lubricating oil and if used in liquid, is cooled by such a liquid. Thus the bearing is excellent for use in food machines, washers, sewage treatment apparatus.

Moreover, if the bearing is constructed from synthetic resins which have low abrasion properties, for example nylon resin, flurocarbon resin, the bearing will compare favorably with steel bearings.

What I claim and desire to secure by Letters Patent is:

1. A bearing comprising, a pair of rings jointly defining an outer race split normal to an axis of the bearing, a drum-like inner race, a plurality of contact rolling elements disposed spaced circumferentially of said inner race and between the inner race and outer race, a cage defining the spacing among the rolling elements, each rolling element having a bore, said cage comprising a pair of annular retaining members, one retaining member having a plurality of laterally extending projections each extending through respective bores of said rolling elements and a second one of said retaining members comprising a ring having a plurality of circumferentially spaced openings receiving free ends of said projections extending through said respective bores of said rolling elements and retaining said first retaining member in assembly with said rolling elements, means adjustably holding said pair of rings assembled for variably adjusting said split therebetween, said rings having respective flanges disposed extending inwardly defining an annular space between said flanges within which said cage and said rolling elements assembled therewith are displaced, one of said rings comprising a base defining a pedestal, said inner race having a circumferential groove on an outer peripheral surface thereof, said rolling elements each having an outer periphery comprising surfaces tapered toward an apex disposed in a plane normal to the longitudinal axis thereof, said groove being tapered toward the axis of said inner race to receive tapered surfaces of said rolling elements, siad rings each comprise an inner circumferential surface tapered to coact with said surfaces of said inner race for holding said rolling elements rolling circumferentially of said inner race along a path defined by said groove, said tapered surfaces on said rings diverging from said axis of the bearing in a direction toward said apex of the rolling elements, and said inner race, said outer race, said retaining member and said rolling elements each are made of molded plastic.

\* \* \* \* \*